United States Patent [19]

Kordik

[11] 3,984,711

[45] Oct. 5, 1976

[54] VARIABLE RELUCTANCE STEP MOTOR WITH PERMANENT MAGNETS

[75] Inventor: Kenneth S. Kordik, Rockton, Ill.

[73] Assignee: Warner Electric Brake & Clutch Company, South Beloit, Ill.

[22] Filed: Apr. 7, 1975

[21] Appl. No.: 565,530

[52] U.S. Cl. .............................. 310/49 R; 310/181; 310/154
[51] Int. Cl.² ........................................ H02K 37/00
[58] Field of Search ............ 310/49, 192, 181, 154, 310/155, 43, 162–165

[56] References Cited
UNITED STATES PATENTS

| | | | |
|---|---|---|---|
| 3,334,254 | 8/1967 | Kober | 310/156 |
| 3,423,617 | 1/1969 | Kohlhagen | 310/181 X |
| 3,439,200 | 4/1969 | Saito et al. | 310/181 X |
| 3,906,268 | 9/1975 | de Graffeuried | 310/154 |

FOREIGN PATENTS OR APPLICATIONS

| | | | |
|---|---|---|---|
| 1,174,418 | 7/1964 | Germany | 310/154 |

Primary Examiner—Donovan F. Duggan
Attorney, Agent, or Firm—Leydig, Voit, Osann, Mayer & Holt, Ltd.

[57] ABSTRACT

Permanent magnets are interposed within the circumferential spaces between the circumferentially spaced pole pieces of the stator of a variable reluctance step motor. The magnets are magnetized in a circumferential direction and serve to increase the dynamic and holding torque characteristics of the motor while providing the motor with detenting torque and while dampening overshoot and oscillation of the rotor of the motor as the rotor arrives at and settles into its detent positions.

3 Claims, 6 Drawing Figures

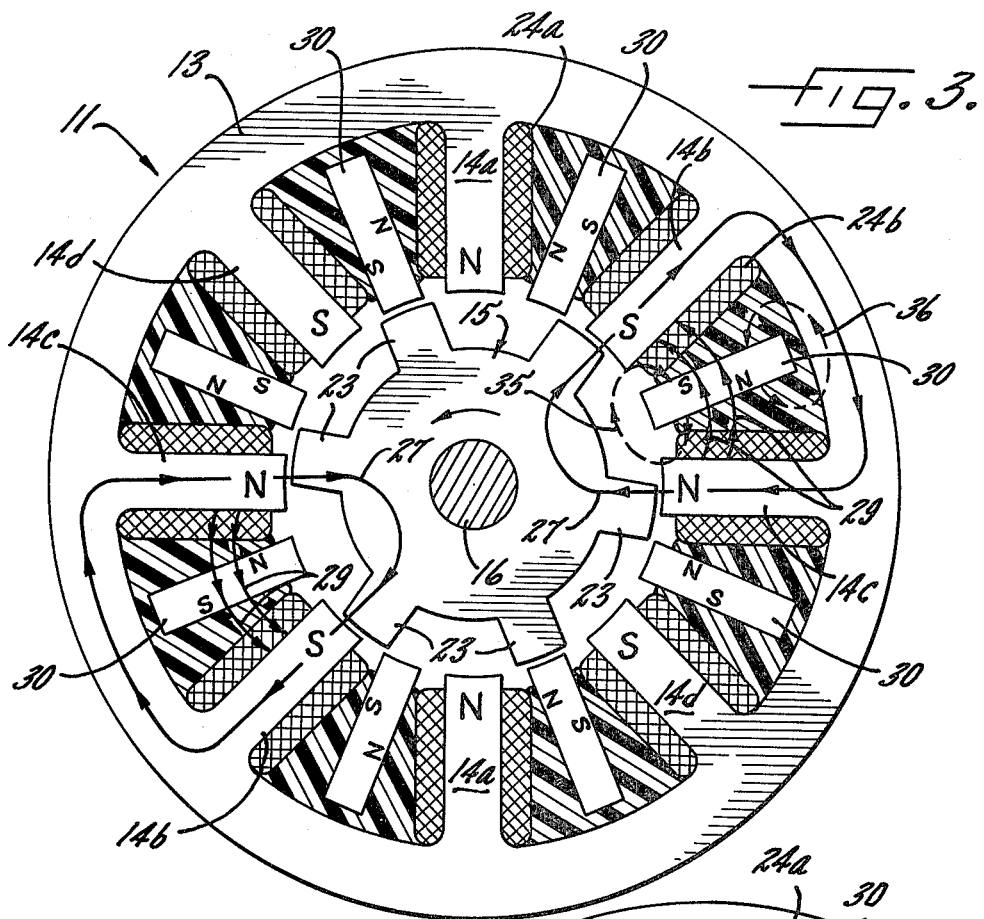
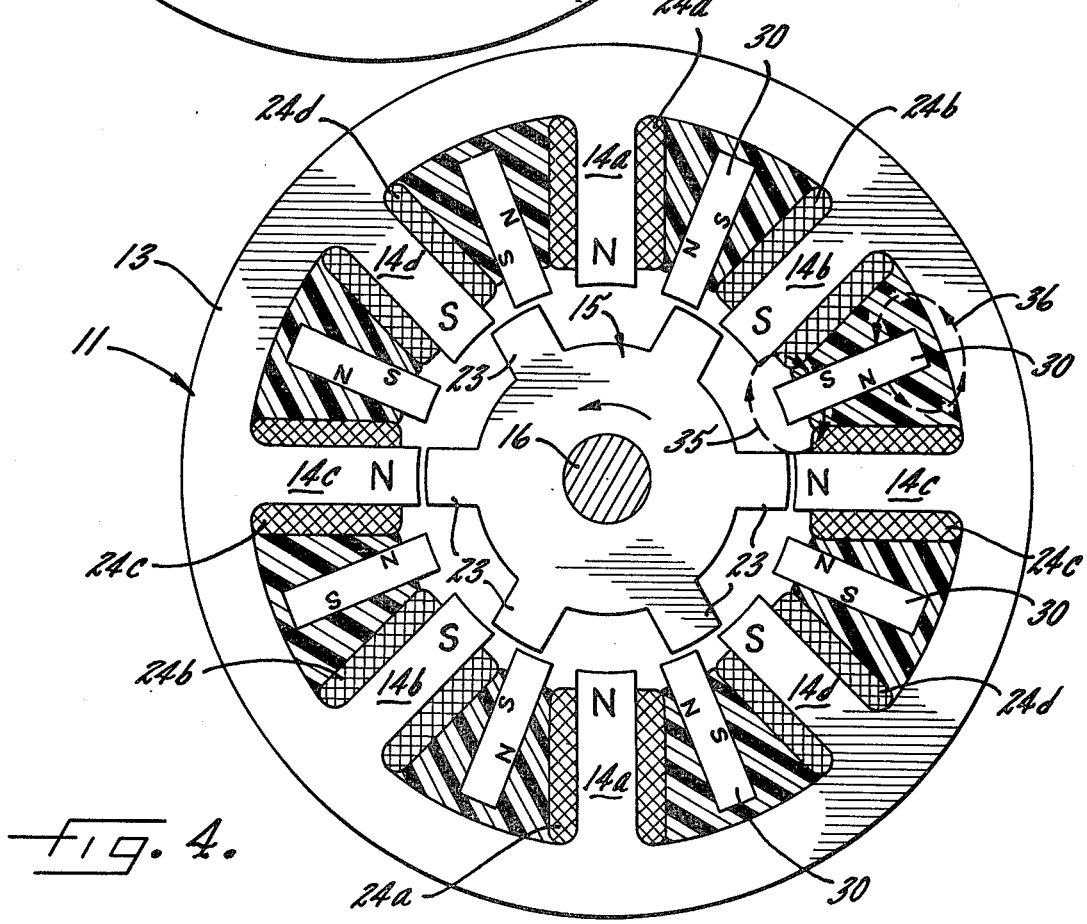

3,984,711

VARIABLE RELUCTANCE STEP MOTOR WITH PERMANENT MAGNETS

BACKGROUND OF THE INVENTION

This invention relates to variable reluctance step motors of the type in which a rotor member is rotatably stepped relative to a stator member by magnetic flux produced as a result of the simultaneous energization of adjacent windings which extend around circumferentially spaced pole pieces on one of the members.

SUMMARY OF THE INVENTION

The general aim of the present invention is to improve the performance of variable reluctance step motors of the above type by interposing circumferentially magnetized permanent magnets within the circumferential spaces between the pole pieces.

A further object is to use the permanent magnets to reduce the leakage of winding-produced flux between adjacent and simultaneously excited pole pieces and to cause more flux to be effectively used in advancing the rotor to and holding the rotor in its stop or detent positions so as to increase both the dynamic and holding torque characteristics of the motor.

Still another object is to make advantageous use of the permanent magnets to reduce overshoot of the rotor past its detent positions and to dampen oscillation of the rotor as it settles into its detent positions.

The invention further resides in the use of the magnets to reduce the time required to step the rotor between its detent positions and also to hold the rotor in a stopped position and retard free-wheeling of the rotor when all of the windings are de-energized.

These and other objects and advantages of the invention will become more apparent from the following detailed description when taken in conjunction with the accompanying drawings.

BRIEF DESCRIPTION OF THE DRAWINGS

FIG. 3 is a view similar to FIG. 2 but shows the rotor as positioned after having been advanced through one step.

FIG. 4 is a view similar to FIG. 2 but shows one of the positions which the rotor occupies when all of the windings are de-energized.

DETAILED DESCRIPTION OF THE PREFERRED EMBODIMENT

Figure 1:
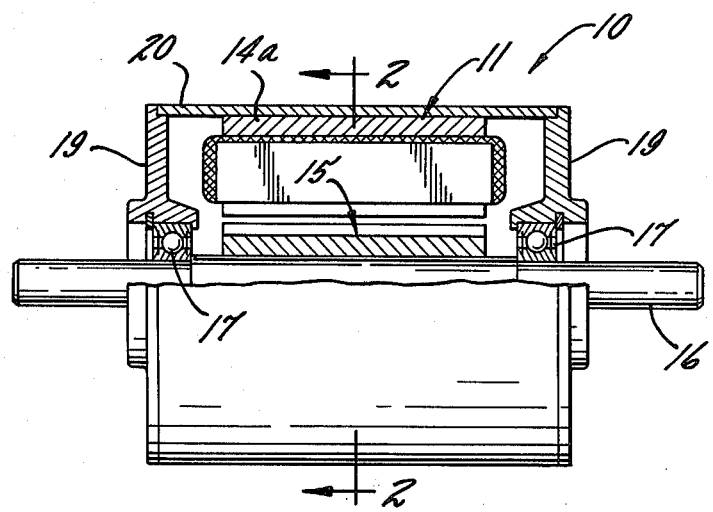
FIG. 1 is a side elevation of a new and improved step motor embodying the unique features of the present invention, part of the motor being broken away and shown in cross-section.

One type of variable reluctance step motor with which the present invention is specifically concerned is a so-called four phase motor 10 shown in FIGS. 1 to 4. The motor comprises a stator member 11 formed by a laminated stack of thin soft iron plates defining an outer ring 13 and a plurality (herein, eight) of radially inwardly extending pole pieces 14 having arcuately concave inner ends or tips. The pole pieces are spaced equally and circumferentially around the ring and are grouped into four sets 14a, 14b, 14c and 14d (commonly referred to as "phases") each containing two pole pieces spaced 180 degrees from one another. The two pole pieces of each phase are separated from one another by a pole piece of each of the other three phases and, in this instance, the pole pieces alternate clockwise around the ring 13 in the sequence a, b, c, d.

Disposed within the circle defined by the tips of the pole pieces 14 is a rotor member 15 having a central shaft 16 (FIG. 1) journaled in a pair of bearings 17 mounted in end plates 19 which are connected to opposite ends of a cylindrical housing 20 within which the stator 11 is secured. The rotor 15 further comprises a laminated stack of magnetically permeable soft iron plates secured to the shaft and forming an inner annulus 21 (FIG. 2) and a series of six equally spaced teeth 23 extending radially outwardly from the annulus. The outer ends of the rotor teeth are arcuately convex, have substantially the same width as the tips of the pole pieces 14, and are of a radial length such that small radial air gaps exist between the teeth and the pole pieces when the teeth are disposed in opposing relation with the pole pieces.

Step-by-step rotation of the rotor 15 is effected by intermittently exciting the pole pieces 14 of the four phases in a predetermined sequence, the two pole pieces of a given phase being excited simultaneously. For this purpose, multi-turn windings 24a, 24b, 24c and 24d are wound around the pole pieces 14a, 14b, 14c and 14d, respectively. The windings are wound in a pattern such that adjacent pole pieces have opposite polarities when the windings are energized. In the illustrated embodiment, the phase a pole piece 14a at the top of the ring 13 is a north pole while the adjacent pole piece 14b is a south pole, the next pole piece 14c a north pole, the adjacent phase d pole piece 14d a south pole, the second phase a pole piece 14a a north pole and so on around the ring.

Figure 5:
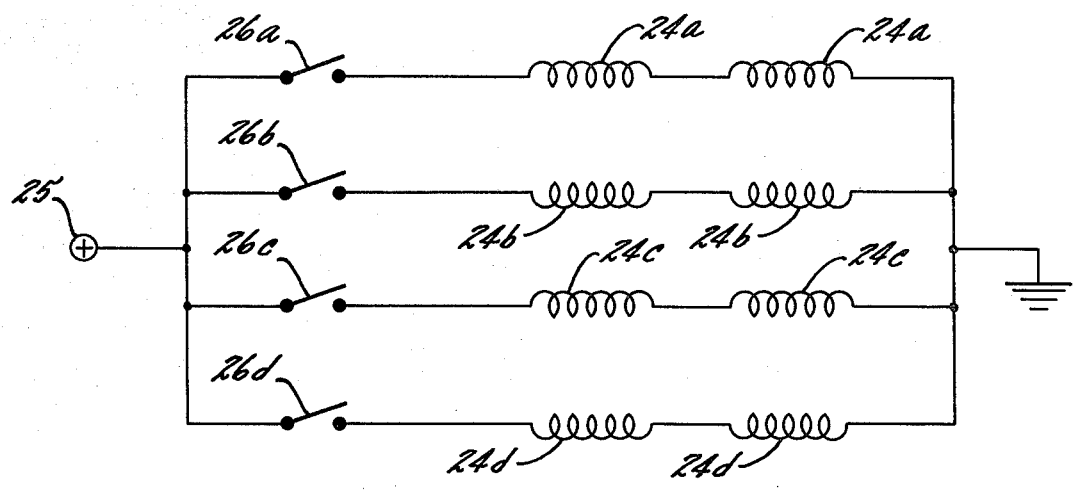
FIG. 5 is a diagram illustrating the circuit for the windings, the circuit having been shown in very elementary form.

A control circuit for the windings 24a to 24d is shown in very elementary form in FIG. 5. As shown, the two windings of each phase a, b, c and d are serially connected with one another to form four series paths which are connected in parallel across a dc. voltage source 25 and which include switching devices 26a, 26b, 26c and 26d. While the switching devices most usually will be in the form of transistors adapted to be rendered conductive and non-conductive, they herein are shown simply as on-off switches adapted to be sequentially closed and opened. Closure of a given switch energizes both windings of the corresponding phase.

Figure 2:
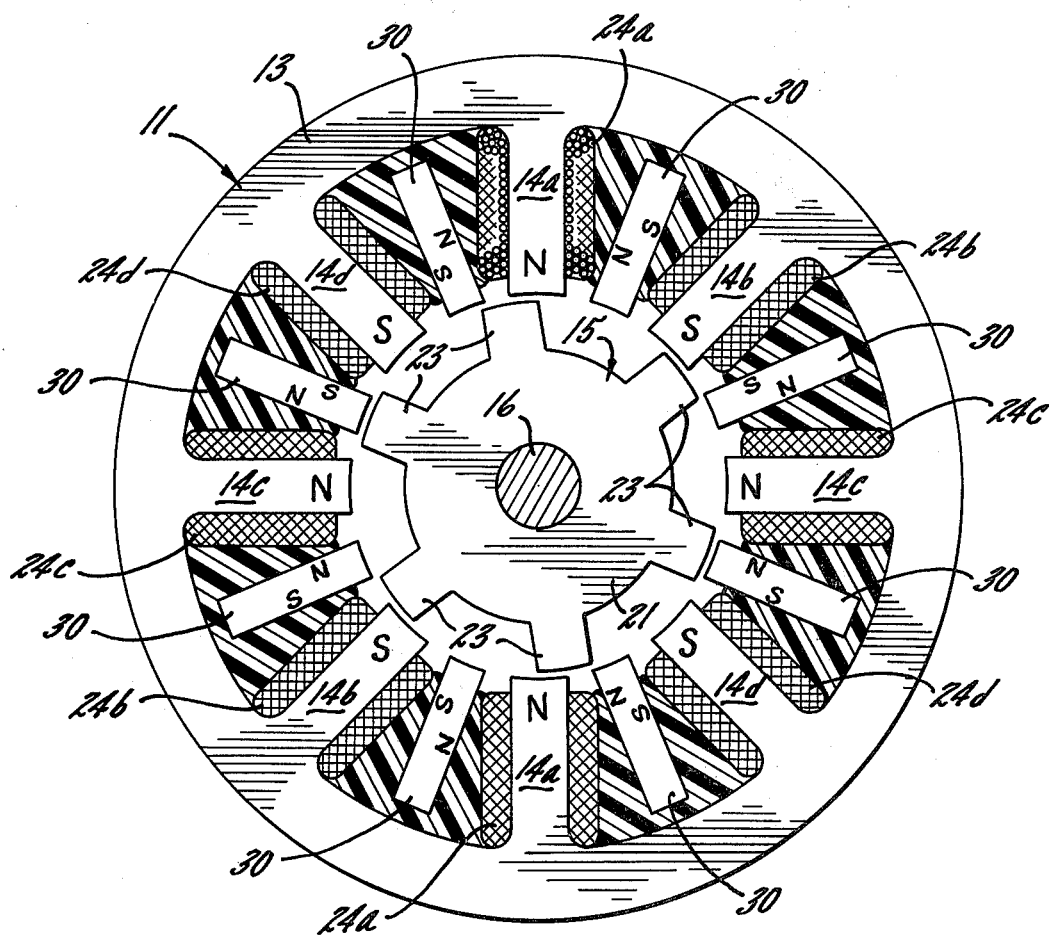
FIG. 2 is an enlarged cross-section taken substantially along the line 2—2 of FIG. 1 and showing the rotor and stator of the motor somewhat schematically.

To explain the operation of the motor 10 as described thus far, let it be assumed that the rotor 15 is positiond as illustrated in FIG. 2 in which two diametrically opposite teeth 23 are disposed in partial circumferential alinement (e.g., half alined) with the phase a pole pieces 14a and in which another pair of diametrically opposite teeth are disposed in partial circumferential alinement with the adjacent phase b pole pieces 14b. The position shown in FIG. 2 is one of the stop or detent positions of the rotor and is the position which the rotor occupies when the windings 24a and 24b are continuously and simultaneously energized by closure of the switches 26a and 26b.

In order to effect counterclockwise rotation of the rotor 15 through one step, the windings 24a are de-energized, the windings 24b are kept in an energized state, and the windings 24c are energized by closure of the switch 26c. With the windings 24b and 24c energized, magnetic flux is produced and passes between the stator 11 and the rotor 15 along two paths each indicated generally by the reference numeral 27 (FIG. 3). Thus, flux from the tip of each north pole piece 14c passes inwardly into the rotor 15 via the air gap and the adjacent rotor tooth 23, thence outwardly into the tip of the adjacent excited south pole piece 14b and then finally around the outer or back path defined by the stator ring 13. The action of the flux attracts the rotor teeth adjacent the pole pieces 14b and 14c and causes the rotor teeth to move counterclockwise from the position shown in FIG. 2 toward the position shown in FIG. 3. When one tooth is half-alined with the pole piece 14b and the adjacent tooth is half-alined with the pole piece 14c, the teeth are in a position establishing minimum reluctance (i.e., minimum resistance to magnetic flux) in the overall flux path 27 and, with the teeth having once settled into that position, they will remain there as long as the windings 24b and 24c are maintained in an energized state. The rotor may be stepped further in a counterclockwise direction by de-energizing the windings 24b and energizing the windings 24d while keeping the windings 24c in an energized state, and then by de-energizing the windings 24c and energizing the windings 24a, and so on. In each case, four of the rotor teeth 23 will seek alinement with the pole pieces 14 having the energized windings and will cause the rotor 15 to step counterclockwise through an angle of fifteen degrees and to ultimately settle into a detent position in which the four teeth are half-alined with the excited pole pieces. By energizing the windings in the phase sequence of d, c, b, a, the rotor can be made to step in a clockwise direction.

The dynamic torque which the rotor 15 is capable of developing when stepping between its detent positions is dependent upon the magnitude of the flux which cuts across the radial air gaps between the pole pieces 14 and the rotor teeth 23 and which passes between the stator and the rotor along the paths 27. Also, the holding torque (i.e., the force tending to hold the rotor in a given detent position when adjacent windings 24 are energized) is dependent upon the magnitude of the flux passing along the paths 27. Because adjacent pole pieces of opposite polarity are simultaneously excited, some flux does not pass through the rotor along the paths 27 but instead passes directly from the north pole piece to the adjacent excited south pole piece along leakage paths indicated generally and very schematically by the reference numeral 29 (FIG. 3). Such leakage flux does not effectively contribute to the magnetic force tending to advance the rotor.

I have discovered that both the dynamic torque and holding torque of a given variable reluctance stepping motor can be increased significantly by interposing circumferentially magnetized permanent magnets 30 in the circumferential spaces between the pole pieces 14. The flux produced by the permanent magnets resists leakage of winding-produced flux between adjacent excited pole pieces along the paths 29 and forces more of the winding-produced flux to pass along the effective paths 27 between the stator 11 and the rotor 15. In addition, some of the magnet-produced flux passes between the tips of the pole pieces 14 and the rotor teeth 23 and augments the winding-produced flux. As a result of the magnet-produced flux both resisting leakage of and augmenting the winding-produced flux, the flux density of the effective paths 27 is increased and thus the motor is capable of developing greater torque when the windings 24 are energized with current of a given magnitude.

More specifically, the permanent magnets 30 which are used herein preferably are composed of rare earth material such as samarium cobalt or barium titanate and possess a high energy product. The magnets have an elongated block-like shape and are centered within the spaces between the pole pieces 14. The magnets may be cemented within the spaces by a bonding agent such as epoxy or the like, the bonding agent serving to fill up the spaces and to secure the magnets to the windings 24 and the outer ring 13.

Each of the magnets 30 is magnetized in a circumferential direction. That is, the circumferentially facing sides of each magnet define the magnet poles and thus flux passes from one circumferentially facing side of each magnet and then around the inner and outer ends of the magnet into the opposite circumferentially facing side of the magnet along the dotted-line paths indicated generally by the reference numerals 35 and 36 (FIG. 3). The inner and outer flux paths 35 and 36 are shown isolated and thus more clearly in FIG. 4.

In keeping with the invention, the magnets are positioned within the spaces between the pole pieces 14 in such a manner that each pole of each magnet is disposed adjacent to and in facing relationship with a pole piece 14 of the same or like polarity. Accordingly, those magnets between the pole pieces 14b and 14c and those between the pole pieces 14d and 14a are positioned with their north poles facing clockwise while the remaining four magnets are positioned with their north poles facing counterclockwise.

With the foregoing arrangement, leakage flux tending to pass directly from an excited north pole piece 14 to an adjacent excited south pole piece along the leakage path 29 is resisted or bucked by the flux which is produced by the intervening permanent magnet 30 and which passes in the opposite direction along the path 35. In effect, the leakage path 29 is made of higher reluctance by the permanent magnet flux so that more of the winding-produced flux tends to pass between the stator 11 and the rotor 15 along the effective path 27. The magnet-produced flux not only reduces leakage of the winding-produced flux but also that portion of the magnet-produced flux which passes along the inner path 35 tends to add to or augment the winding-produced flux in that portion of the path 27 which spans the radial air gaps between the pole pieces 14 and the rotor teeth 23. Accordingly, the total flux passing effectively between the radial air gaps is significantly increased so as to enable the motor 10 to develop more torque, both during steady state stepping of the rotor 15 and when the rotor is held in a detent position by continuous energization of the appropriate pairs of windings 24. Tests have demonstrated and confirmed that one particular motor constructed in accordance with the invention and incorporating permanent magnets between the pole pieces is capable of developing between 25 and 30 percent more running torque than an identical motor without the magnets when the two motors are operated under identical conditions and by the same voltage source.

It should be recognized that because of the inertia of the rotor 15, the rotor teeth 23 tend to pass by or overshoot the excited pole pieces 14 rather than stopping immediately in detent positions in which the teeth are half-alined with the pole pieces. After the teeth have overshot the pole pieces in one direction, the flux attracts the teeth in the reverse rotational direction and the teeth tend to overshoot the pole pieces reversely but by a shorter angular distance. Thus, the rotor has a tendency to oscillate back and forth as the teeth seek out and settle into their detent positions.

Figure 6:
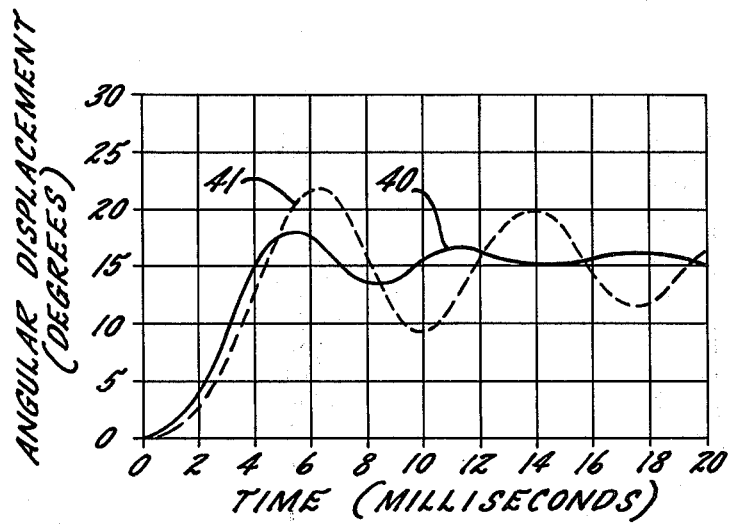
FIG. 6 shows two curves which provide a comparison of the single-step displacement vs. time characteristics of a motor incorporating the magnets of the invention and of an identical motor without magnets.

I have found that the interposition of the permanent magnets 30 within the circumferential spaces between the pole pieces 14 appreciably shortens initial overshoot of the rotor 15 past its detent positions and significantly dampens oscillation of the rotor so as to reduce the time required for the rotor to settle into each detent position. This advantageous aspect of the magnets is made clear by FIG. 6 in which the curve 40 illustrates the angular displacement of the rotor 15 of the present motor 10 with respect to time when the rotor is advanced through a single step. The curve 41 shown in FIG. 6 illustrates the single step displacement vs. time characteristics of the rotor of an identical motor operated under the same conditions but without permanent magnets interposed between the pole pieces.

By comparing the two curves 40 and 41, it will be seen that the rotor 15 of the present motor 10 advances from a dead stop at one detent position and through one step of fifteen degrees to the next detent position at a faster rate and thus in a shorter time than the rotor of the magnetless motor. Moreover, the distance by which the rotor 15 initially overshoots the detent position is only about one-half the initial overshoot distance of the rotor of the magnetless motor. Finally, the rotor 15 settles into its detent position much more quickly than and does not oscillate nearly as much as the rotor of the magnetless motor.

The reasons why the permanent magnets 30 reduce overshoot and dampen oscillation of the rotor 15 are not known with precise certainty. It is believed, however, that the flux produced by the permanent magnets influences the inductance of the windings 24 in such a manner as to permit a faster current rise in the windings which are newly energized to effect stepping of the rotor from one detent position to the next. The flux in the paths 27 thus rises faster to cause the rotor to begin moving sooner and at a higher rate. The faster moving rotor and the magnet-produced flux cause the current in the just energized windings to increase, the current in the steadily energized windings to fluctuate, and the current in the just de-energized windings to decay in such a manner relative to the transient position of the rotor that the net flux actually exerts a negative or reverse torque on the rotor as the latter approaches its detent position and moves through the last three or four degrees of the fifteen degree step. The reverse torque tends to overcome the inertia of the rotor and brings the rotor to a faster stop than is the case with the magnetless motor where no reverse torque is exerted on the rotor until the latter actually reaches its detent position. With the rotor 15 having overshot its detent position by a shorter distance, it can return reversely to the detent position more quickly and with less reverse overshot. Moreover, upon returning to its detent position, the reversely rotating rotor 15 is subjected to a higher positive or forward torque than the rotor of the magnetless motor and thus the rotor 15 settles into its detent position more quickly and with less oscillation.

The magnets 30 further provide the motor 10 with positive detenting torque in that the magnets tend to hold the rotor 15 in a stopped condition after all of the windings 24 have been de-energized. Upon de-energization of all of the windings, the magnet-produced flux causes the rotor to advance one-half step (assuming that there is little or no load on the shaft) out of its normal detent position to the position shown in FIG. 4 in which one diametrically opposite pair of rotor teeth 23 move into virtually perfect circumferential alinement with the previously most nearly adjacent pole pieces 14. The magnet-produced flux spanning the radial air gaps between the alined rotor teeth and pole pieces tends to resist movement of the rotor from this position and thus retards free rotation of the rotor. While the use of magnets to produce detenting torque is not new per se, I believe that it is indeed new to provide detenting in the four-phase motor 10 which has been described.

From the foregoing, it will be apparent that the present invention brings to the art a new and improved step motor 10 which, when compared with an identical magnetless motor, is capable of producing higher dynamic and holding torque, possesses detenting torque, and is capable of executing a single step in less time while settling out more quickly and with less oscillation of the rotor. It should be appreciated that the principles of the invention are applicable to a so-called stacked motor in which the stator is divided into axially and angularly spaced sections and in which angularly adjacent pole pieces of opposite polarity are simultaneously excited.

I claim as my invention:

1. A variable reluctance step motor having a stator member, a rotor member telescoped with and rotatable relative to said stator member, one of said members having a series of circumferentially spaced pole pieces projecting radially toward the other of said members, a winding around each one of said circumferentially spaced pole pieces and energizable to effect rotation of said rotor, and a permanent magnet interposed in the circumferential space between every adjacent pair of said pole pieces and magnetized in a circumferential direction.

2. A variable reluctance step motor as defined in claim 1 in which the windings on a pair of adjacent pole pieces are energized simultaneously and are arranged to cause said pair of adjacent pole pieces to be of opposite polarity, the magnet between said pair of pole pieces being located such that each pole of the magnet is positioned adjacent a pole piece of the same polarity as the pole.

3. A variable reluctant step motor having a stator, a toothed rotor telescoped within and rotatable relative to said stator, said stator having a series of circumferentially spaced pole pieces projecting radially inwardly toward said rotor, energizable windings around said pole pieces and arranged to cause adjacent pole pieces to be of opposite polarity, the windings of two adjacent pole pieces being energized simultaneously to produce flux which passes along a path extending through said rotor from one of said pole pieces to the other of said pole pieces and thereby effect rotation of said rotor, and permanent magnets interposed in the circumferential direction, each magnet being located such that each of its poles is positioned adjacent a pole piece of the same polarity as the pole whereby the flux produced by each magnet resists the leakage of winding-produced flux passing along a path exclusive of said rotor.

* * * * *